Fig. 4.

S. A. DOBYNE.
FASTENER INSERTING MACHINE.
APPLICATION FILED APR. 6, 1914.

1,286,559.

Patented Dec. 3, 1918.
6 SHEETS—SHEET 5.

S. A. DOBYNE.
FASTENER INSERTING MACHINE.
APPLICATION FILED APR. 6, 1914.

1,286,559.

Patented Dec. 3, 1918.
6 SHEETS—SHEET 6.

Attest:
Chas. A. Becker,
Arthur B. Cremer.

Inventor:
Stephen A. Dobyne,
by John N. Bruninga,
His Attorney.

UNITED STATES PATENT OFFICE.

STEPHEN A. DOBYNE, OF ST. LOUIS, MISSOURI, ASSIGNOR TO CHAMPION SHOE MACHINERY COMPANY, OF ST. LOUIS, MISSOURI, A CORPORATION OF MISSOURI.

FASTENER-INSERTING MACHINE.

1,286,559.  Specification of Letters Patent.  Patented Dec. 3, 1918.

Application filed April 6, 1914. Serial No. 830,050.

*To all whom it may concern:*

Be it known that I, STEPHEN A. DOBYNE, a citizen of the United States, and residing at St. Louis, in the State of Missouri, have invented certain new and useful Improvements in Fastener-Inserting Machines, of which the following is a specification.

This invention relates to fastener inserting machines and, more particularly, to machines known as string nailing machines, such as shown in a patent of G. A. and S. A. Dobyne, No. 1,091,298, March 24, 1914, of which this invention is an improvement.

Some of the objects of this invention are, to improve the construction of machines of this type, and more particularly, to improve the construction of the machine of said patent, so as to make its action more positive and certain, and to improve the construction and operation of the throat, fastener stock guide, awl and driver.

Further objects will appear from the detail description, taken in connection with the accompanying drawings, in which, Fig. 2 is a side elevation from the right side of the machine.

Referring to the accompanying drawings, 10 designates a column supporting the machine head 11, which latter carries the operating mechanism of this machine, including a drive shaft 12, mounted in suitable bearings thereon. The drive shaft carries a series of cam wheels, 13, 14, 15 and 16, and a belt pulley 17. A foot-plate or presser-foot 20 is provided with a corrugated work-engaging surface 21, and with a shank 22 whereby it is secured to the head. A horn or work support 23 of suitable construction is provided to coöperate with the presser-foot and support the work. This horn or work support is positioned in the line of drive, that is, in the vertical line where the nail is driven to be clenched on the horn anvil.

*The awl mechanism.*—The head 11 has projecting laterally therefrom a lug 25 provided with a guideway 26 adapted to support a slide 27. This slide is connected by a link 28 with a lever 29. The connection between the slide and the link is made by a stud 24, screwed into the slide, and an eccentric sleeve 30 provided with a knurled head, which is perforated to receive an adjusting tool. The stud is provided with a head 31 to clamp the sleeve in position. A stud 32 passing through the link 28, has a washer 34 thereon between the link and the arm, and a square sleeve 33 sliding in a guideway 37 in the arm. The diameter of the stud is reduced as shown at 36 to form a shoulder bearing against the sleeve 33, and this reduced part is threaded into a nut 38 sliding in a guideway in the rear face of the arm. The stud has a head 35 whereby it may be turned to permit adjustment of the link 28 on the lever 29. The guideway in the lever 29 is on an arc of a circle having the link 28 as a radius. The lever 29 is rigidly secured to a stub-shaft 39 mounted in the lug 25, and having rigidly secured thereto an arm 40 provided with a cam roll engaging a closed cam groove 41 in the cam wheel 14. The awl is thus moved positively into and out of the line of drive.

Figures 5, 6, 7, 8, 9, 10, 11, 12:
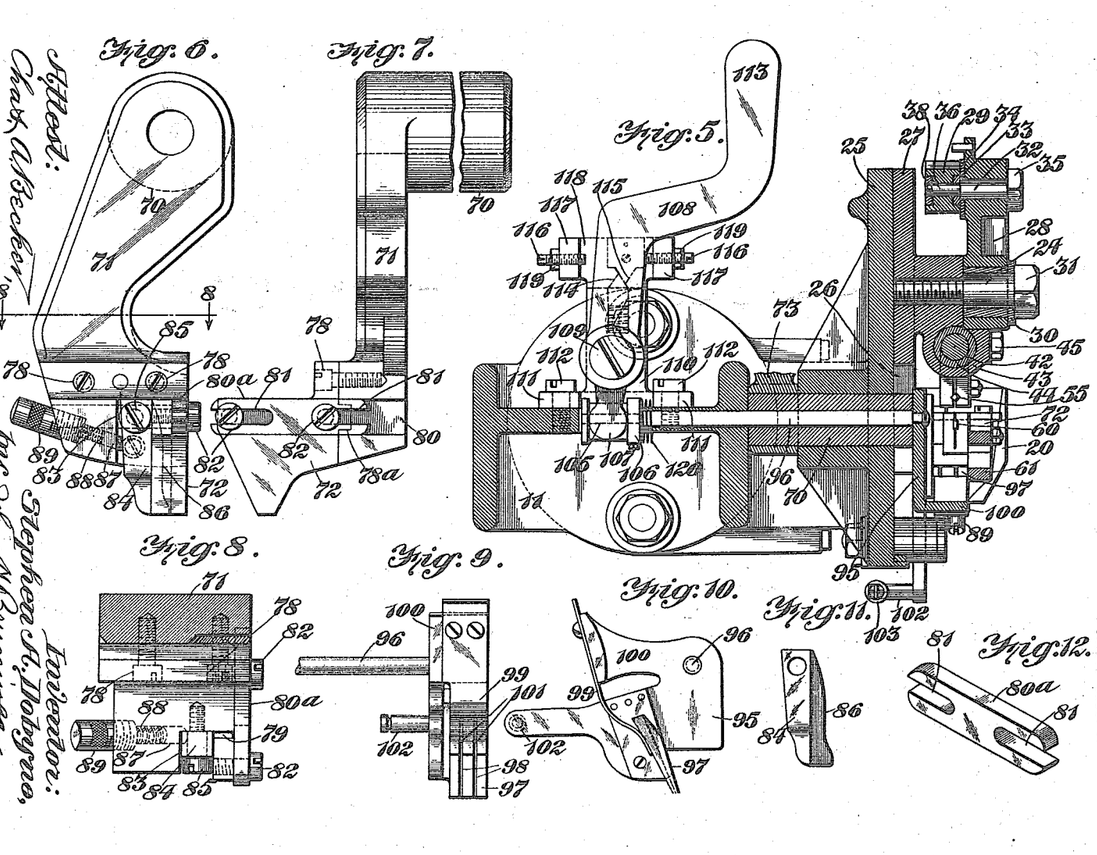
Fig. 5 is a section on the line 5—5, Fig. 3.
Fig. 6 is a detail front elevation of the throat.
Fig. 7 is a detail side elevation.
Fig. 8 is a section on the line 8—8, Fig. 6.
Fig. 9 is a side elevation of the fastener stock guide.
Fig. 10 is a front elevation.
Fig. 11 is a detail side elevation of the fastener guiding member.
Fig. 12 is a perspective view of the die plate.
Figure 13:
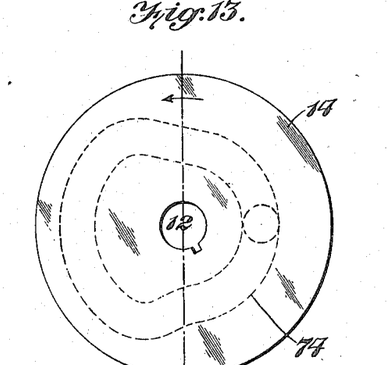
Figs. 13 to 16 inclusive are face views of the cams 14, 15 and 16, the views being taken from the front of the machine looking toward the rear thereof.
Figure 14:
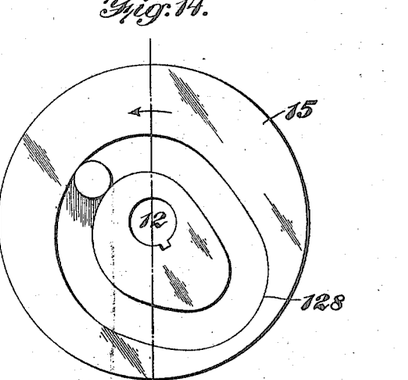
Figure 15:
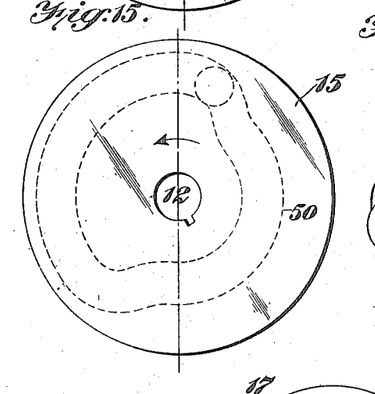
Figure 16:
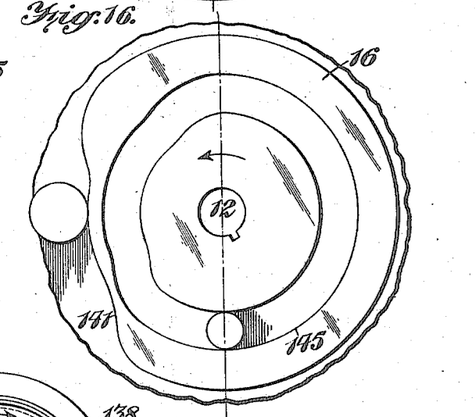
Figure 17:
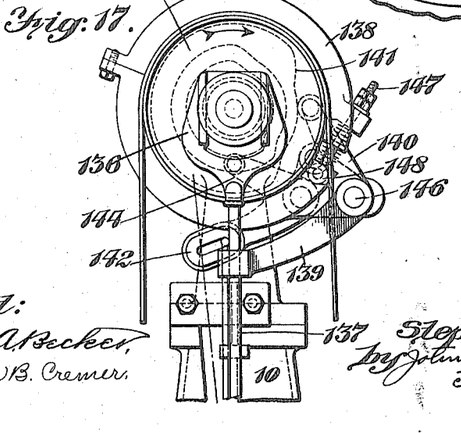
Fig. 17 is a diagrammatical rear elevation of the machine, and, Fig. 18 is a horizontal section through the throat actuating lever, on the line 18—18, Fig. 2, showing the adjustable cam roll.

An awl bar 42 is mounted to slide vertically in a bearing 43 on the slide 27, this guideway being provided with a bushing 44, as shown in Fig. 5, clamped in position by means of screws 45. The awl bar has swiveled thereon a block 46 engaging a forked lever 47, which is rigidly mounted on a shaft 48 on the machine head and provided with an arm 49 having a cam roll engaging a cam groove 50 in the cam wheel 15. The awl bar is bent laterally to form an arm 51, and a lug 52 on the machine head is formed to provide a recess 53 closed by a cap 54, so as to form a guide for the arm 51 and hold the awl bar against turning, at the same time permitting free vertical and lateral movements thereof. The awl bar is provided with an awl 55 clamped therein in the usual way.

The cam groove 50 will, through the medium of the arms 49 and 47, reciprocate the awl vertically in its vertical bearing in the slide 27. The cam groove 41 will, through the arms 40 and 29, reciprocate the slide 27 and the awl thereon laterally to feed the work, the awl moving into and out of the line of drive as is usual in machines of this type. The awl can be alined with the driver by adjusting the eccentric sleeve 30, while the feed of the awl can be adjusted by varying the position of the stud 32 in the guideway 37 of the lever 29. It will be noted that the awl is operated positively in both directions, both when feeding and piercing, and that the adjustments are positive.

Figure 1:
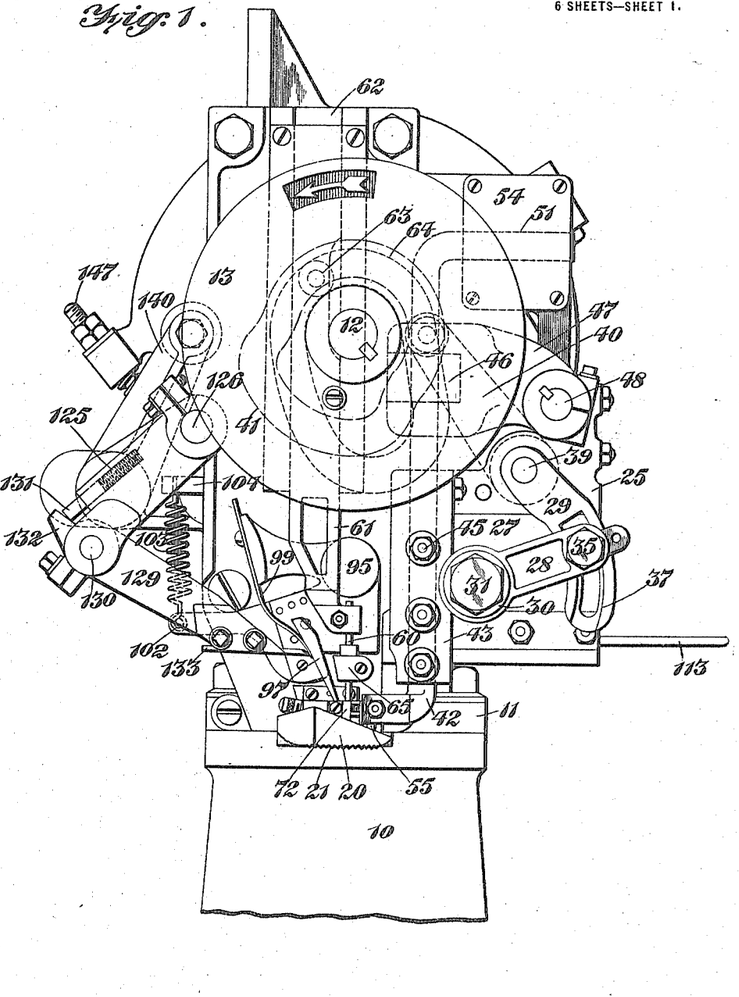
Figure 1 is a front elevation of a machine embodying this invention.
Figures 2, 18:
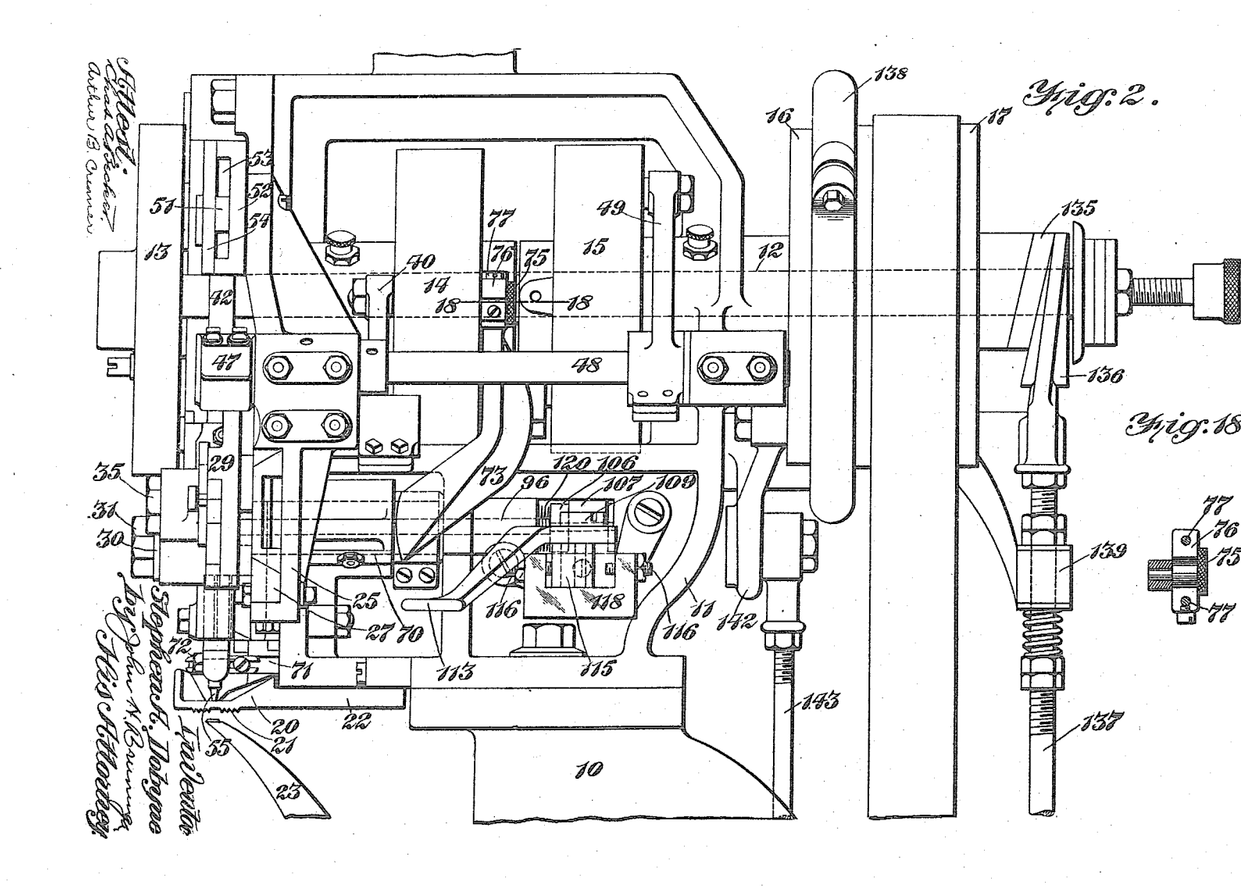
Figure 3:
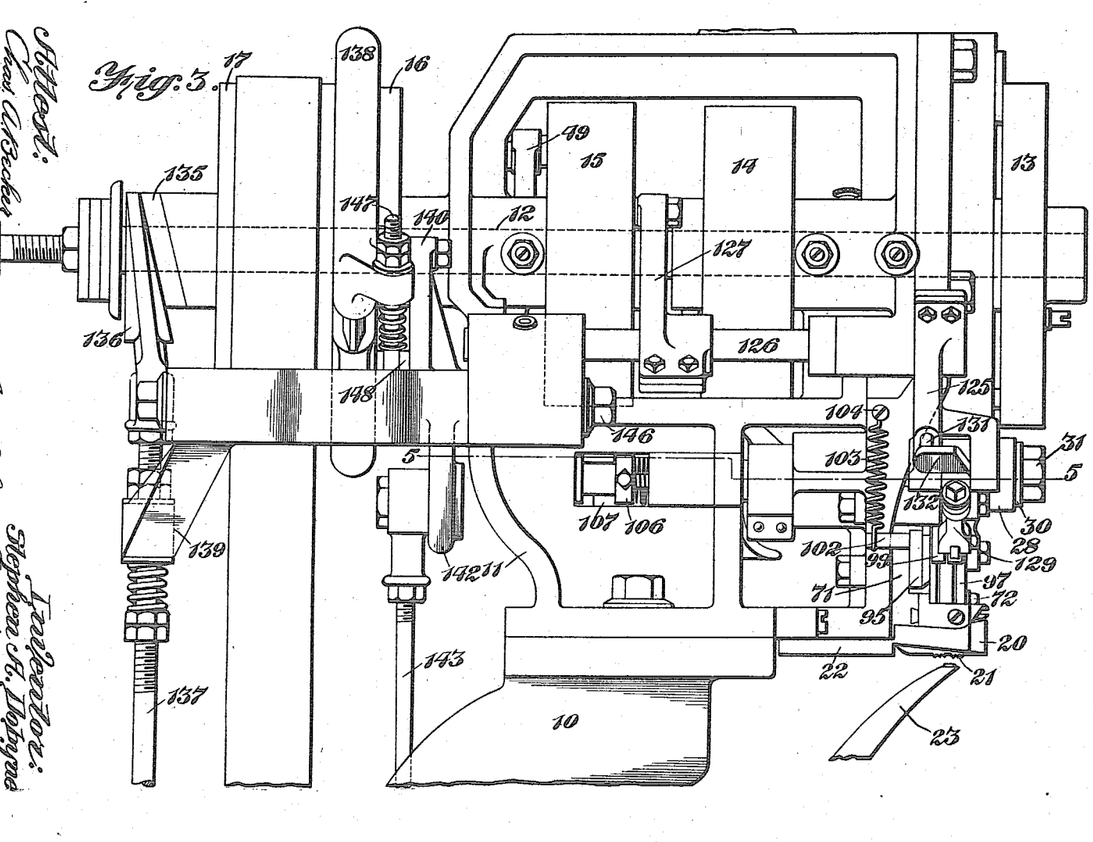
Fig. 3 is a side elevation from the left side of the machine.
Figure 4:
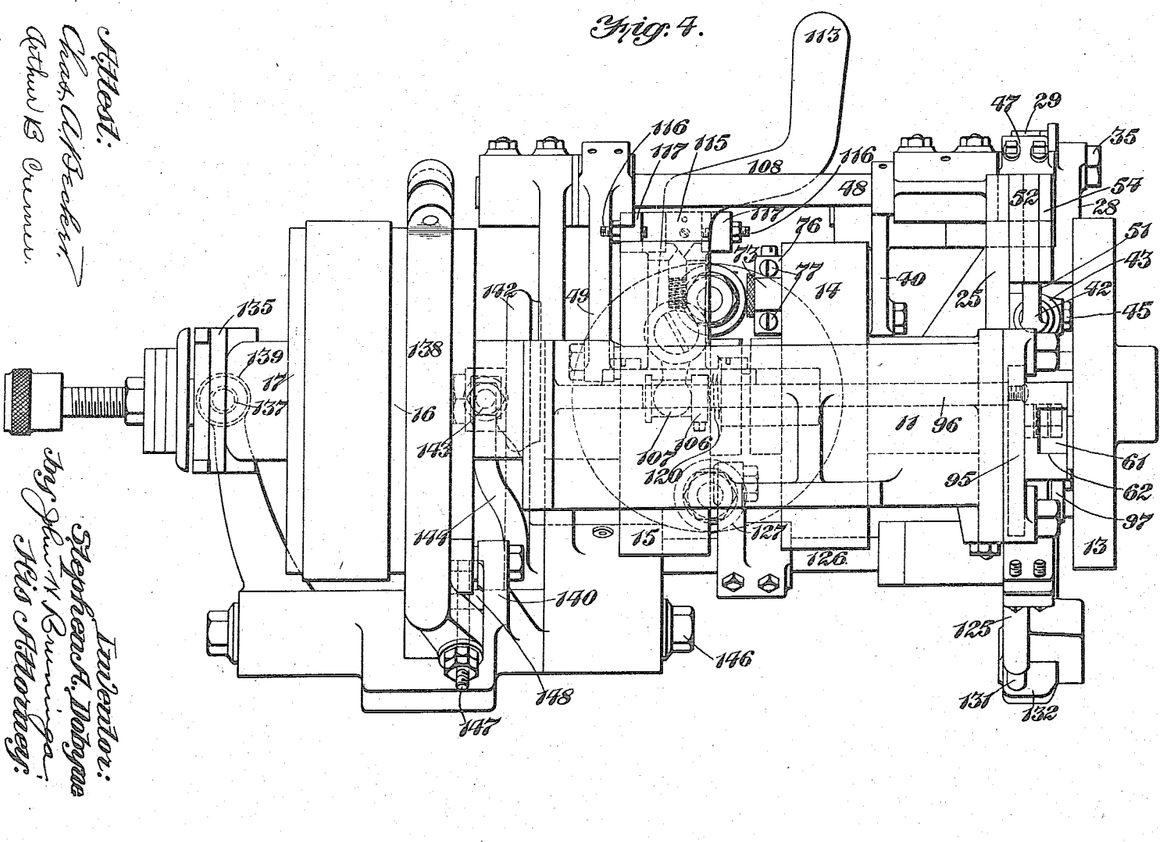
Fig. 4 is a plan.

*The driving mechanism.*—A driver 60 is clamped in a driver bar 61, which moves vertically in a guideway 62 on the machine head. A cam roll 63 on the driver bar engages a cam groove in the rear face of the cam wheel 13. The driver is provided with a guide 65 of substantially the same construction as shown in the patent hereinbefore referred to. By means of this construction the movement imparted to the driver will be positive, and in view of the fact that the driver is cam-driven, the operation thereof will be silent as well as free of vibration. The cam wheel has a direction indicator thereon, as shown in Fig. 1.

*The throat mechanism.*—The machine head is bored to provide a bearing for a sleeve or hollow shank 70, which has integral therewith an arm 71 carrying a throat 72. The sleeve has further clamped thereon an arm 73 provided with a cam roll engaging a cam groove 74 in the cam wheel 14. The cam roll is mounted on an eccentric shaft or pin 75 having a knurled head and mounted in the end of the lever 73, provided with a cap 76 attached by screws 77, which clamp this eccentric shaft in adjusted position.

The throat 72 is provided with a rib 78ª engaging a channel in the lever 71, and this throat is clamped in position by means of screws 78. The throat is grooved to provide a driver passage 79, and is channeled at 80 to receive a cutter or die plate 80ª, this die forming a part of one of the walls of the driver passage, and being provided at its ends with slots 81 to receive screws 82 which clamp the die in position on the throat. The throat is further provided with a recess 83 which receives a fastener guiding member 84 pivoted at 85 and having a rib or fin 86 projecting into the driver passage as described in said patent. A plug 87 bears against the fastener guiding member, and this plug is under the tension of a spring 88, which bears at one end against the plug and at its other end against a knurled screw 89 threaded into the throat and adjustable therein to vary the tension of the spring.

The cam 74 and the arm 73 operate to oscillate the throat so as to move the driver passage alternately into and out of the line of drive. In order that the driver passage may be accurately alined with the driver, the eccentric mounting of the cam roll is provided. By adjustment of the knurled-headed cam roll pin 75 the adjustment may be performed with great accuracy, and after this adjustment has been obtained, the pin may be clamped so as to firmly hold the parts in adjusted position. It will be noted that the throat is moved positively into and out of the line of drive, and that this throat is moved by a closed cam, or a cam groove, which positively positions and holds the throat in each of its positions, permitting no play and absolutely preventing the parts from getting out of alinement or step. At the same time, the adjustment of the cam roll permits this construction to be used, permitting accurate alinement of this throat. The cam, therefore, has an uninterrupted connection with the throat and supports the throat and the die thereon against the action of the feeding and cutting blade (hereinafter described). The construction and arrangement of the die 80ª permits this die to be adjusted longitudinally to renew the cutting surface exposed to the driver passage and, moreover, the die can be reversed so as to utilize every part of all of its four cutting edges. The die can, therefore, be used for a considerable time without requiring regrinding.

*The fastener stock guide.*—The fastener stock guide 95 is rigidly mounted on the end of a shaft 96, which passes through the hollow sleeve or shank 70, so as to oscillate concentrically with the throat. This guide is provided with a plate 97 having a plurality of slots 98 to receive strings of connected nails or fastener stock of different sizes. A spring stop plate 99 is mounted on an arm 100, and this plate bears against the plate 97 and is provided with slots 101. A pin 102 is mounted on a projecting arm on the guide, and engages one end of a spring 103, the other end of which is attached at 104 to the machine head.

The shaft 96 is reduced in diameter at 105, and has rigidly mounted thereon a spool 106 engaged by the forked end 107 of a shift-lever 108, which is pivoted at 109 on a bracket 110, having ears 111 whereby it may be clamped to the machine head by screws 112. The lever 108 is provided with an operating handle 113, which extends downwardly so as to be convenient for operation from the right side of the machine. A wedge-shaped spring pressed slide block 114 is mounted in a bore in the bracket 110 so as to engage a wedge-shaped block 115 secured to the under side of the lever 108. This wedge-shaped block, 115, is adapted to be moved into engagement with either one of the screw stops 116, adjustably mounted in upwardly extending spaced lugs 117 on an extension 118 of the bracket 110. The screw stops 116 are provided with lock-nuts 119 to lock them in adjusted positions. A spring 120 bears at one end against the spool 106 and at the other end against the machine head.

The fastener stock guide, which is pivoted concentrically with the throat, is adapted to oscillate, and the spring 103 normally tends to move this guide in a clockwise direction, Fig. 1. This guide can be shifted laterally to position either of the grooves 98 in alinement with the driver passage in the throat. Thus, in the position of the parts as shown in the drawings, the right-hand groove, Fig. 9, is positioned in alinement with the driver passage. The lever 108 is, at this time, in position with the wedge block 115 in engagement with the right stop, Fig. 5. The parts will be held in this position by means of the wedge-shaped block 114. In order to shift the guide to position the left-hand groove 98 in alinement with the driver passage, the lever 108 is moved to the left, Fig. 5, so as to throw the block 115 in engagement with the left stop 116. This will move the shaft 96 to the right and position the guide in the required position. As the lever is moved to the left, the block 114 will yield and will then snap on the other side of the block 115 so as to again secure the parts in adjusted position. Either of the grooves 98 may be alined with respect to the driver passage by adjustment of the proper stop, and this adjustment may be independent for each groove. By placing a spring 120 between the guide shaft and the machine head, the end play of parts is kept constant and on one side and in one direction.

*The feeding and cutting mechanism.*—A lever 125 is rigidly connected to a shaft 126 mounted in bearings on the machine head, and having an arm 127 provided with a cam roll engaging a cam groove 128 in the cam wheel 15. An arm 129 is pivoted to the arm 125 at 130, and the arm 125 is provided with a spring-pressed plug 131 bearing against a lug 132 on the arm 129. The end of the arm 129 has clamped therein a cutter blade of substantially the same construction as described in said patent. The operation of the feeding and cutting member is the same as in said patent. By operating this arm from a closed cam, not only is the construction simpler, but the operation is more positive and satisfactory.

*The clutch and horn operating mechanisms.*—A clutch 135 of usual construction is operated by a wedge 136 on a clutch shifting rod 137. The band brake 138 is of the usual form and is pivoted at one end at 146 on the machine head, while its free end is connected by a link 147 pivotally connected to an arm 148, integral with an arm 139, pivoted at 146 and connected to the clutch rod 137. The arm 139 has also rigidly connected therewith an arm 140 provided with a cam roll bearing on a cam 141 on the cam wheel 16. The operation of this clutch and brake mechanism is well known. When the clutch rod 137 is raised the arm 140 is first thrown outwardly and the brake released, and the wedge 136 thereafter throws in the clutch. If the clutch treadle is now released, the cam roll on the arm 140 will bear on the high part of the cam and permit the machine to continue in operation until the low part of the cam is reached. The cam roll will then drop on this low part of the cam and cause the clutch rod spring (not shown) to apply the brake.

An arm 142 of a bell crank lever, pivoted on the machine head, has a connection with a horn controlling rod 143, and the other arm 144 of the bell crank lever has a cam roll engaging a cam groove 145 in the cam wheel 16. The horn controlling mechanism may be of the usual construction, and further description will, therefore, be unnecessary.

*Summary of operation.*—The general operation of this machine is the same as the machine of the patent referred to. During the cycle of operations the awl will be moved downwardly by the cam 50 to pierce the work, and the awl bar and slide will be then moved laterally to feed the work until the awl itself is placed in the line of drive, which in this case, is in alinement with the driver, which is at this time raised. The awl will then be raised out of the work, and the awl slide will thereafter move the awl to the right and back to its original position. During the feeding movement of the awl, the throat will be moved out of the line of drive under the action of its cam 74. During the return movement of the awl, the throat will be moved back into the line of drive by its cam, and thereafter the feeding and cutting member 133 will be moved downwardly by its cam 128 to first feed a nail into the throat, and then move laterally with respect to the throat to cut off the nail so positioned. The feeding and cutting member and the fastener stock guide will thereafter return to original positions, and the driver will then move down under the action of its cam 64 and drive the nail so positioned in the throat. In this machine, as in the machine of the patent, an abrupt bend is formed on the end of the nail so as to predetermine the direction of the clench, in a manner fully described in said patent.

It will be noted that in this machine all parts are driven by closed cams, which not only results in a positive operation of the parts, but also in a positive relation and correlation of the parts. Both the awl and the throat are, therefore, moved positively into and out of the line of drive. The connections to the awl and the throat are so correlated, on account of the positive uninterrupted connections between the drive shaft and these two movable parts, that the awl and the throat will follow one another in a predetermined relation, irrespective of the speed of the machine. It is thus positively insured that the awl and the driver will alternately be positioned into and out of the line of drive, without liability of slipping, and without liability of these movable members getting out of step relatively. This is essential in a machine of this type which operates at a high speed, and in which the nails move from one position to another in the machine. The parts cannot only be adjusted for nails of different sizes, but these parts can also be adjusted relatively to bring the elements into accurate relation.

It is obvious that various changes may be made in details of construction without departing from the spirit of this invention, and it is, therefore, to be understood that this invention is not to be limited to the specific construction shown and described.

Having thus described the invention what is claimed is:

1. In a fastener inserting machine, the combination with a laterally fixed driver and a laterally movable work feeding awl, of a fastener guiding throat mounted to swing into and out of the line of drive, and operating means having continuous engagement with said throat for positively moving said throat in both directions.

2. In a fastener inserting machine, the combination with a laterally fixed driver and a laterally movable work feeding awl, of a fastener guiding throat mounted to swing into and out of the line of drive, and operating means having uninterrupted connection with said throat for positively moving said throat in both directions.

3. In a fastener inserting machine, the combination with a laterally fixed driver and a laterally movable work feeding awl, of a fastener guiding throat mounted to swing into and out of the line of drive, and cam operated means having uninterrupted connection with said throat for positively moving said throat in both directions.

4. In a fastener inserting machine, the combination with a laterally fixed driver and a laterally movable work feeding awl, of a fastener guiding throat mounted to swing into and out of the line of drive, and means operated by a groove cam and connected with said throat for positively moving said throat in both directions.

5. In a fastener inserting machine, the combination with a laterally fixed driver, of a fastener guiding throat mounted to swing into and out of the line of drive, awl mechanism including an awl movable into and out of the line of drive, and operating means independent of said awl mechanism for moving said throat in both directions.

6. In a fastener inserting machine, the combination with a laterally fixed driver, of a fastener guiding throat mounted to swing into and out of the line of drive, awl mechanism including an awl movable into and out of the line of drive, and operating means independent of said awl mechanism for positively moving said throat in both directions.

7. In a fastener inserting machine, the combination with a laterally fixed driver, of a fastener guiding throat mounted to swing into and out of the line of drive, awl mechanism including an awl movable into and out of the line of drive, and independent operating means for positively moving said throat and awl in both directions.

8. In a fastener inserting machine, the combination with a laterally fixed driver, of a fastener guiding throat mounted to swing into and out of the line of drive, awl mechanism including an awl movable into and out of the line of drive, and independent operating means having uninterrupted connections with said throat and awl for positively moving said parts in both directions.

9. In a fastener inserting machine, the combination with a laterally fixed driver and a laterally movable work feeding awl, of a fastener guiding throat mounted for movement into and out of the line of drive, means for supplying fastener stock to said throat, a cutter for severing the fastener stock, and means having uninterrupted connection with said throat for positively moving said throat in both directions.

10. In a fastener inserting machine, the combination with a laterally fixed driver and a laterally movable work feeding awl, of a fastener guiding throat mounted for movement into and out of the line of drive, means for supplying fastener stock to said throat, a cutter coöperating with said throat to cut the fastener stock, and means other than the awl or its carrier for positively moving said throat adapted to support said throat against the action of said cutter.

11. In a fastener inserting machine, the combination with a laterally fixed driver and a laterally movable work feeding awl, of a fastener guiding throat mounted for movement into and out of the line of drive, means for supplying fastener stock to said throat, a cutter coöperating with said throat to cut the fastener stock, and means other than the awl or its carrier for positively moving said throat in both directions, adapted to support said throat against the action of said cutter.

12. In a fastener inserting machine, the combination with a laterally fixed driver and a laterally movable work feeding awl, of a fastener guiding throat mounted for movement into and out of the line of drive, means for supplying fastener stock to said throat, a cutter coöperating with said throat to cut the fastener stock, and means having uninterrupted connection with said throat, for positively moving said throat, adapted to support said throat against the action of said cutter.

13. In a fastener inserting machine, the combination with a laterally fixed driver and a laterally movable work feeding awl, of a fastener guiding throat mounted for movement into and out of the line of drive, means for supplying fastener stock to said throat, a cutter coöperating with said throat to cut the fastener stock, and means having uninterrupted connection with said throat for positively moving said throat in both directions, adapted to support said throat against the action of said cutter.

14. In a fastener inserting machine, the combination with a laterally fixed driver and a laterally movable work feeding awl, of a fastener guiding throat mounted to swing into and out of the line of drive, means for supplying fastener stock to said throat, a cutter coöperating with said throat to cut the fastener stock, and cam operated means other than the awl or its carrier for positively moving said throat, adapted to support said throat against the action of said cutter.

15. In a fastener inserting machine, the combination with a laterally fixed driver, of a fastener guiding throat mounted for movement into and out of the line of drive, awl feed mechanism including an awl movable into and out of the line of drive, means for supplying fastener stock to said throat, a cutter for severing the fastener stock, and means having uninterrupted connection with said throat for positively moving said throat in both directions.

16. In a fastener inserting machine, the combination with a laterally fixed driver, of a fastener guiding throat mounted for movement into and out of the line of drive, awl feed mechanism including an awl movable into and out of the line of drive, means for supplying fastener stock to said throat, a cutter coöperating with said throat to cut the fastener stock, and means other than the awl or its carrier for positively moving said throat adapted to support said throat against the action of said cutter.

17. In a fastener inserting machine, the combination with a laterally fixed driver, of a fastener guiding throat mounted to swing into and out of the line of drive, awl feed mechanism including an awl movable into and out of the line of drive, means for supplying fastener stock to said throat, a cutter coöperating with said throat to cut the fastener stock, and cam operated means other than the awl or its carrier for positively moving said throat, adapted to support said throat against the action of said cutter.

18. In a fastener inserting machine, the combination with fastener driving means, of a throat mounted to swing into and out of the line of drive, a movable fastener stock guide coöperating with said throat, a feeding and cutting member coöperating with said throat and guide to feed and cut the fastener stock, and means having uninterrupted connection with said throat for positively moving said throat in both directions.

19. In a fastener inserting machine, the combination with a laterally fixed driver and a laterally movable work feeding awl, of a throat mounted to swing into and out of the line of drive, a movable fastener stock guide coöperating with said throat, a feeding and cutting member coöperating with said throat and guide to feed and cut the fastener stock, and means other than the awl or its carrier for positively moving said throat adapted to support said throat against the action of said cutter.

20. In a fastener inserting machine, the combination with fastener driving means, of a throat mounted to swing into and out of the line of drive, a swinging fastener stock guide, awl feed mechanism, including an awl movable into and out of the line of drive, and means having uninterrupted connection with said throat for positively moving said throat in both directions.

21. In a fastener inserting machine, the combination with fastener driving means, of a throat mounted to swing into and out of the line of drive, a swinging fastener stock guide, awl feed mechanism, including an awl movable into and out of the line of drive, and means independent of the awl mechanism for positively moving said throat in both directions.

22. In a fastener inserting machine, the combination with fastener driving means, of a throat mounted for movement into and out of the line of drive, a guide for a string of connected fasteners, feeding and cutting means constructed and arranged to engage the head of a fastener on the string and feed the string into said throat, and coöperate with said throat to cut the string to position a cut fastener in said throat, a work feeding awl, and means having uninterrupted connection with said throat for moving said throat into and out of the line of drive.

23. In a fastener inserting machine, the combination with a laterally fixed driver, of a throat mounted for movement into and out of the line of drive, a guide for a string of connected fasteners, feeding and cutting means constructed and arranged to engage the head of a fastener on the string and feed the string into said throat, and coöperate with said throat to cut the string to position a cut fastener in said throat, a work feeding awl, and means other than the awl or its carrier for moving said throat constructed and arranged to support said throat against the action of said feeding and cutting means.

24. In a fastener inserting machine, the combination with fastener driving means, of a throat mounted for movement into and out of the line of drive, a guide for a string of connected fasteners, feeding and cutting means constructed and arranged to engage the head of a fastener on the string and feed the string into said throat, and coöperate with said throat to cut the string to position a cut fastener in said throat, a work feeding awl, and means having uninterrupted connection with said throat for moving said throat into and out of the line of drive, constructed and arranged to support said throat against the action of said feeding and cutting means.

25. In a fastener inserting machine, the combination with a laterally fixed driver, of a throat mounted for movement into and out of the line of drive, a guide for a string of connected fasteners, feeding and cutting means constructed and arranged to engage the head of a fastener on the string and feed the string into said throat, and coöperate with said throat to cut the string to position a cut fastener in said throat, a work feeding awl, and a cam exclusive of the awl and its actuating mechanism for moving said throat constructed and arranged to support said throat against the action of said feeding and cutting means.

26. In a fastener inserting machine, the combination with fastener driving means, of a throat mounted for movement into and out of the line of drive, a guide for a string of connected fasteners, feeding and cutting means constructed and arranged to engage the head of a fastener on the string and feed the string into said throat, and coöperate with said throat to cut the string to position a cut fastener in said throat, a work feeding awl, and a cam for positively moving said throat in both directions, constructed and arranged to support said throat against the action of said feeding and cutting means.

27. In a fastener inserting machine, the combination with fastener inserting means, of a throat mounted to move into and out of the line of drive, a work feeding awl, a movable fastener stock guide coöperating with said throat, means independent of said awl for positively moving said throat in both directions, and a spring for moving said guide.

28. In a fastener inserting machine, the combination with fastener inserting means, of a throat mounted to move into and out of the line of drive, a work feeding awl, a movable fastener stock guide, a feeding and cutting member coöperating with said guide and said throat, means other than the awl or its carrier for moving said throat constructed and arranged to support said throat against the action of said feeding and cutting member, and means for yieldingly sustaining said guide against the action of said feeding and cutting member.

29. In a fastener inserting machine, the combination with fastener driving means, of a throat mounted to swing into and out of the line of drive, a work feeding awl, a fastener stock guide mounted to swing with respect to said throat, a feeding and cutting member coöperating with said guide and said throat, means other than the awl or its carrier for moving said throat constructed and arranged to support said throat against the action of said feeding and cutting member, and means for yieldingly sustaining said guide against the action of said feeding and cutting member.

30. In a fastener inserting machine, the combination with a machine head, of a slide thereon, an awl mounted for movement on said slide, means for operating said slide, and a connection between said operating means and said slide, adjustable to aline said awl with respect to the line of drive.

31. In a fastener inserting machine, the combination with a machine head, of a slide thereon, an awl mounted for movement on said slide, means for operating said slide, and a connection between said operating means and said slide, comprising an eccentric adjustable to aline said awl with respect to the line of drive.

32. In a fastener inserting machine, the combination with a machine head, of a slide thereon, and awl mounted for movement on said slide, means for operating said slide, and a connection between said operating means and said slide, comprising a pivot and an eccentric sleeve on said pivot, adjustable to aline said awl with respect to the line of drive.

33. In a fastener inserting machine, the combination with a machine head, of a slide thereon, an awl mounted for movement on said slide, means for operating said slide, and a connection between said operating means and said slide comprising means for permitting adjusting movement of said slide to vary the feed of the awl, and means for adjusting said slide to aline the awl with respect to the line of drive.

34. In a fastener inserting machine, the combination with a machine head, of a slide thereon, an awl mounted for movement on said slide, a lever for operating said slide, a link connecting said slide and lever, and an eccentric pivotal connection between said link and said slide constructed and arranged to aline said awl with respect to the line of drive.

35. In a fastener inserting machine, the combination with a machine head, of a slide thereon, an awl mounted for movement on said slide, a lever for operating said slide, a link connecting said slide and lever, an adjustable sliding connection between said link and lever constructed and arranged to permit adjustment of the feed of the awl, and an eccentric pivotal connection between said link and said slide constructed and arranged to aline said awl with respect to the line of drive.

36. In a fastener inserting machine, the combination with a machine head, of a slide thereon, an awl bar mounted for movement on said slide, means for operating said slide, means for operating said awl bar, and an arm on said awl bar for holding said awl bar against turning.

37. In a fastener inserting machine, the combination with a machine head, of a slide thereon, an awl bar mounted for movement on said slide, means for operating said awl bar, a guide on said head, and a laterally projecting arm on said awl bar engaging said guide for holding said awl bar against turning.

38. In a fastener inserting machine, the combination with fastener inserting means, of a throat pivoted to swing into and out of the line of drive, a fastener stock guide pivoted concentrically with respect to said throat for guiding a plurality of strands of fastener stock, and means for shifting said guide with respect to said throat.

39. In a fastener inserting machine, the combination with fastener inserting means, of a throat pivoted to swing into and out of the line of drive, a fastener stock guide having a shaft constructed and arranged to pivot the same concentric with respect to said throat, and means engaging said shaft to shift said guide with respect to said throat.

40. In a fastener inserting machine, the combination with fastener inserting means, of a throat mounted to move into and out of the line of drive, a movable fastener stock guide for guiding a plurality of strands of fastener stock, stops for positioning said guide in a plurality of positions with respect to said throat, and a spring for taking up the lost motion of said guide.

41. In a fastener inserting machine, the combination with a machine head and fastener inserting means thereon, of a throat having a shank mounted in said head to pivotally support said throat for movement into and out of the line of drive, a fastener stock guide having a shaft extending through said shank, and means engaging said shaft for shifting said guide with respect to said throat.

42. In a fastener inserting machine, a throat having a fastener stock-receiving passage, and a die mounted on said throat to complete said passage, and means permitting lengthwise adjustment of said die to expose different portions thereof to said passage.

43. In a fastener inserting machine, a throat having a fastener stock-receiving passage, and a reversible die mounted on said throat to complete said passage, and means permitting lengthwise adjustment and reversal of said die to expose different portions thereof to said passage.

44. In a fastener inserting machine, the combination with a laterally fixed driver and a laterally movable work feeding awl, of a throat mounted to move into and out of the line of drive, operating means having uninterrupted connection with said throat for moving said throat, and means for alining said throat with the line of drive.

45. In a fastener inserting machine, the combination with a laterally fixed driver and a laterally movable work feeding awl, of a throat mounted to move into and out of the line of drive, operating means having uninterrupted connection with said throat for moving said throat, and means in the connection between said operating means and said throat for alining said throat with the line of drive.

46. In a fastener inserting machine, the combination with a laterally fixed driver and a laterally movable work feeding awl, of a throat mounted to move into and out of the line of drive, operating means having uninterrupted connection with said throat for moving said throat, and means having uninterrupted connection with said throat and said operating means for alining said throat with the line of drive.

47. In a fastener inserting machine, the combination with a laterally fixed driver and a laterally movable work feeding awl, of a throat mounted to move into and out of the line of drive, a cam, and a cam roll engaging said cam and adjustably connected with said throat to aline said throat with the line of drive.

48. In a string-nailing machine, the combination with a horn or work support positioned in the line of drive, of a work feeding awl, a driver, a nail guiding throat, means for guiding a string of connected nails into said throat, feeding and cutting means, constructed and arranged to feed the string into said throat by engagement with the head of a nail on the string, and constructed and arranged to cut the end nail from the string, adapted to position a cut nail in said throat, and means constructed and arranged to move and positively insure the movement of said awl and said throat alternately into and out of the line of drive.

49. In a string-nailing machine, the combination with a horn or work support positioned in the line of drive, of a work feeding awl, a driver, a nail guiding throat, means for guiding a string of connected nails into said throat, feeding and cutting means, constructed and arranged to feed the string into said throat by engagement with the head of a nail on the string, and constructed and arranged to cut the end nail from the string, adapted to position a cut nail in said throat, and means having correlated positive connections with said awl and said throat constructed and arranged to move said awl and said throat alternately into and out of the line of drive.

50. In a string-nailing machine, the combination with a drive shaft and a horn or work support positioned in the line of drive, of a work feeding awl, a driver, a nail guiding throat, means for guiding a string of connected nails into said throat, feeding and cutting means, constructed and arranged to feed the string into said throat by engagement with the head of a nail on the string, and constructed and arranged to cut the end nail from the string, adapted to position a cut nail in said throat, and means operated from said drive shaft constructed and arranged to positively move said awl and said throat alternately into and out of the line of drive.

51. In a string-nailing machine, the combination with a horn or work support positioned in the line of drive, of a work feeding awl, a driver, a nail guiding throat, means for guiding a string of connected nails into said throat, feeding and cutting means, constructed and arranged to feed the string into said throat by engagement with the head of a nail on the string, and constructed and arranged to cut the end nail from the string, adapted to position a cut nail in said throat, and means having correlated uninterrupted connections with said awl and said throat constructed and arranged to move said awl and said throat alternately into and out of the line of drive.

In testimony whereof I affix my signature in the presence of these two witnesses.

STEPHEN A. DOBYNE.

Witnesses:
J. H. BRUNINGA,
A. B. CREMER.

Copies of this patent may be obtained for five cents each, by addressing the "Commissioner of Patents, Washington, D. C."